(12) United States Patent
Vasudevan et al.

(10) Patent No.: US 12,277,588 B2
(45) Date of Patent: Apr. 15, 2025

(54) CATEGORIZATION BASED ON TEXT AND ATTRIBUTE FACTORIZATION

(71) Applicant: Tata Consultancy Services Limited, Mumbai (IN)

(72) Inventors: Bagya Lakshmi Vasudevan, Chennai (IN); Sudesna Baruah, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 314 days.

(21) Appl. No.: 17/974,763

(22) Filed: Oct. 27, 2022

(65) Prior Publication Data
US 2023/0153880 A1   May 18, 2023

(30) Foreign Application Priority Data
Nov. 18, 2021 (IN) .............................. 202121053177

(51) Int. Cl.
*G06Q 30/00* (2023.01)
*G06F 40/30* (2020.01)
*G06Q 30/0601* (2023.01)

(52) U.S. Cl.
CPC ......... *G06Q 30/0627* (2013.01); *G06F 40/30* (2020.01)

(58) Field of Classification Search
CPC .............................................. G06Q 30/06–08
See application file for complete search history.

(56) References Cited

U.S. PATENT DOCUMENTS

| | | | |
|---|---|---|---|
| 2018/0068371 A1* | 3/2018 | Krishnamurthy .. | G06Q 30/0631 |
| 2019/0065589 A1 | 2/2019 | Wen et al. | |
| 2021/0064956 A1* | 3/2021 | Zhiltsov ................. | G06F 17/18 |
| 2022/0138772 A1* | 5/2022 | Laserson ................ | G06N 20/00 |
| | | | 705/7.33 |

OTHER PUBLICATIONS

Urra, Elipe, "Measuring Enrichment of Word Embeddings with Subword and Dictionary Information", Univ. of Western Ontario (Canada), Proquest Dissertations & Theses, 2019 (Year: 2019).*
Kozareva, "Everyone Likes Shopping! Multi-class Product Categorization for e-Commerce," (2015).
Ristoski et al., "A Machine Learning Approach for Product Matching and Categorization," (2016).

* cited by examiner

*Primary Examiner* — Ethan D Civan
(74) *Attorney, Agent, or Firm* — FINNEGAN, HENDERSON, FARABOW, GARRETT & DUNNER LLP

(57) ABSTRACT

This disclosure relates generally to method and system for product data categorization based on text and attribute factorization. The method includes acquiring an input describing a set of product data from an application data store for categorization. The set of product data by removing extraneous text based on a predefined template. Further a dictionary for the set of product data based on a set of attributes comprising a product key with its corresponding product value. Further, a multi-level contextual data for the set of product data are extracted by assigning a weight to each product data based on likelihood and creating a set of datapoints for each product data. The set of product data are categorized by feeding the set of data points to a set of predefined parameters to compute a minimum count, a total size, total number of epochs, a skip gram value and a hierarchical softmax.

12 Claims, 2 Drawing Sheets

CATEGORIZATION BASED ON TEXT AND ATTRIBUTE FACTORIZATION

CROSS-REFERENCE TO RELATED APPLICATIONS AND PRIORITY

This U.S. patent application claims priority under 35 U.S.C. § 119 to: Indian Patent Application No. 202121053177, filed on 18 Nov. 2021. The entire contents of the aforementioned application are incorporated herein by reference.

TECHNICAL FIELD

The disclosure herein generally relates to product categorization, and, more particularly, to method and system for product data categorization based on text and attribute factorization.

BACKGROUND

E-commerce cognitive retail solution is booming with technological advances made in UI design, availability of products, efficient delivery of products and thereof. E-commerce websites maintain a taxonomy of products so that each product can be effectively presented and merchandized to end customers. Due to online shopping and tactile judgment, fashion e-retailers use visual (e.g., pictures and videos) and textual information to reduce consumers' perceived risk and uncertainty, with preferred choice. There is a growing trend to sell many types of consumer products through e-commerce websites in order to maintain or enhance a company's competitiveness, and sometimes to establish a niche market. For products such as footwear, manufacturers face quite a challenge to provide consumers with good fitting and type of shoes. Due to the plethora footwear types/styles offered in the marketplace, it becomes impossible to examine and identify the exact type.

Existing techniques build a product taxonomy using word embedding technique based on semantics which require feeding all taxonomy levels of products to obtain a categorization of each product under the levels of taxonomy. Performing a mere word embedding for semantics with a set of given products, might not yield an expected outcome under consideration. Further, the algorithm internally follows a continuous bag of words approach to fetch semantically similar words or product. Hence, such approaches lack in performing categorization type of the product.

SUMMARY

Embodiments of the present disclosure present technological improvements as solutions to one or more of the above-mentioned technical problems recognized by the inventors in conventional systems. For example, in one embodiment, a system for product data categorization based on text and attribute factorization is provided. The method acquires an input describing a set of product data from an application data store for categorization. The set of product data are preprocessed by removing extraneous text based on a predefined template. Then, a dictionary is created for the set of product data based on a set of attributes comprising a product key with its corresponding product value. Further, for the set of product data a multi-level contextual data is extracted by assigning a weight to each product data based on likelihood and creating a set of datapoints for each product data and the set of product data are categorized by feeding the set of data points to a set of predefined parameters to compute a minimum count, a total size, total number of epochs, a skip gram value and a hierarchical softmax.

In one embodiment extracting the multi-level contextual data comprises performing, a similarity match for each product data with a training dataset associated with a pre-trained Word2Vec model. Further, a weight is assigned to each product data for the closest similarity semantic match based on (i) a product weight, and (ii) a product category weight. The set of product data are pivoted to obtain counts based on the product category and reindexing the assigned weights to align with the pivot table index. The set of data points are created based on the assigned weights using the pivot table index for each product categorization.

In another aspect, a method for product data categorization based on text and attribute factorization is provided. The method acquires an input describing a set of product data from an application data store for categorization. The set of product data are preprocessed by removing extraneous text based on a predefined template. Then, a dictionary is created for the set of product data based on a set of attributes comprising a product key with its corresponding product value. Further, for the set of product data a multi-level contextual data is extracted by assigning a weight to each product data based on likelihood and creating a set of datapoints for each product data and the set of product data are categorized by feeding the set of data points to a set of predefined parameters to compute a minimum count, a total size, total number of epochs, a skip gram value and a hierarchical softmax.

In one embodiment extracting the multi-level contextual data comprises performing, a similarity match for each product data with a training dataset associated with a pre-trained Word2Vec model. Further, a weight is assigned to each product data for the closest similarity semantic match based on (i) a product weight, and (ii) a product category weight. The set of product data are pivoted to obtain counts based on the product category and reindexing the assigned weights to align with the pivot table index. The set of data points are created based on the assigned weights using the pivot table index for each product categorization.

In yet another aspect, provides one or more non-transitory machine-readable information storage mediums comprising one or more instructions, which when executed by one or more hardware processors perform actions includes to import libraries and a defined model to create a list of model vocabulary. The method acquires an input describing a set of product data from an application data store for categorization. The set of product data are pre-processed by removing extraneous text based on a predefined template. Then, a dictionary is created for the set of product data based on a set of attributes comprising a product key with its corresponding product value. Further, for the set of product data a multi-level contextual data is extracted by assigning a weight to each product data based on likelihood and creating a set of datapoints for each product data and the set of product data are categorized by feeding the set of data points to a set of predefined parameters to compute a minimum count, a total size, total number of epochs, a skip gram value and a hierarchical softmax.

In one embodiment extracting the multi-level contextual data comprises performing, a similarity match for each product data with a training dataset associated with a pre-trained Word2Vec model. Further, a weight is assigned to each product data for the closest similarity semantic match based on (i) a product weight, and (ii) a product category weight. The set of product data are pivoted to obtain counts based on the product category and reindexing the assigned weights to align with the pivot table index. The set of data points are created based on the assigned weights using the pivot table index for each product categorization.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for product data categorization based on text and attribute factorization. The method provides an autonomous approach for type-categorization of product data based on numerous text and attribute factorization for the input received as user query. Cognitive retail solution enables categorizing each product data based on text. The system obtains a user query as input and processes the user query by extracting multi-level contextual data for categorization. The user query describes a set of product data from one or more application data store for categorization by extracting multi-level contextual data. The disclosed system 100 is further explained with the method as described in conjunction with FIG. 1 to FIG. 2 below.

Figure 1:
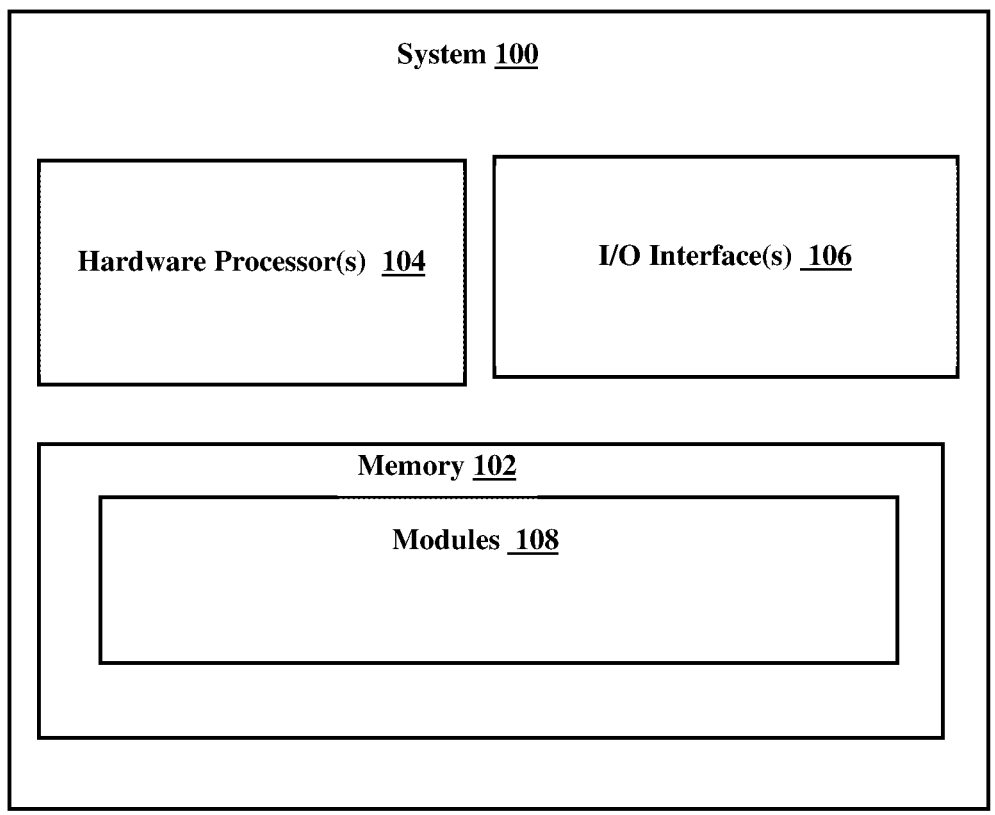
FIG. 1 illustrates an exemplary system for product data categorization based on text and attribute factorization in accordance with some embodiments of the present disclosure.
Figure 2:
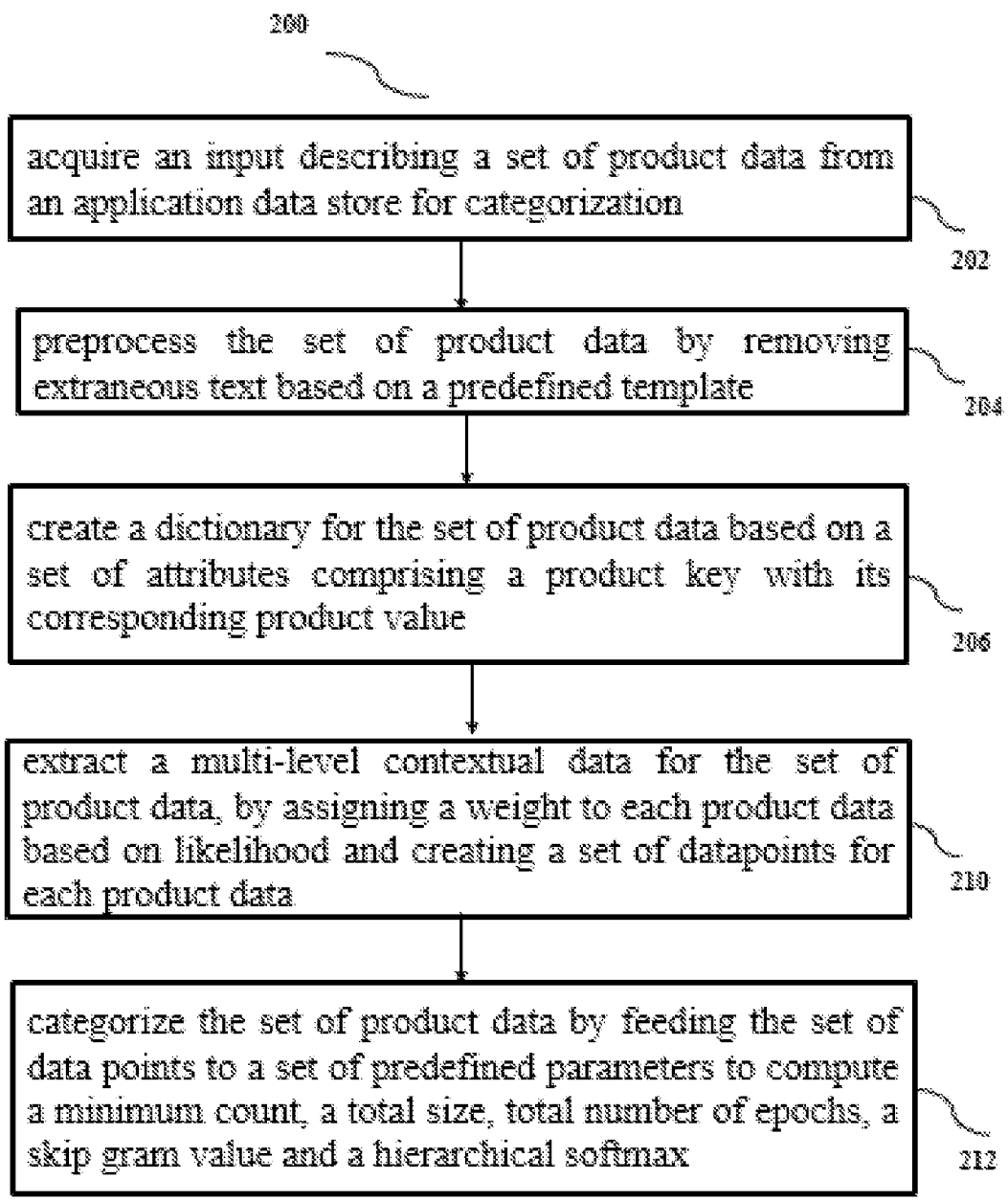
FIG. 2 illustrates a flow diagram showing a method for product data categorization based on text and attribute factorization in accordance with some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

FIG. 1 illustrates an exemplary system for product data categorization based on text and attribute factorization in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2 illustrates a flow diagram showing a method for product data categorization based on text and attribute factorization in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the alarm identification system 100 as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200 the one or more hardware processors 104 acquire an input describing a set of product data from an application data store for categorization. The system 100 is initialized by importing libraries and a defined model to create a list of model vocabulary. The libraries to be preloaded are obtained from the application datastore such as a GENSIM, a PANDAS, and a NLTK. In one embodiment, the libraries include the NLTK with 3.2.5 version, the GENSIM with 8.1 version, and the PANDAS with 0.24.2 version. The NLTK package has a vocabulary library that aids the algorithm to understand words in English language. The GENSIM package has the Word2Vec model in it, from where the model is imported & loaded. The PANDAS package aids in opening the data files for processing. Once, the libraries are loaded the user query is processed, wherein the set of product data includes for example, in a fashion retail, shoes dictionary types are {casual:{sneaker, slides, moccasins, belle}, formal: {classic pumps, mules,}}. The user query (Table 1) is considered in the below dataset,

TABLE 1

Example dataset

| boots | slippers | sandals | sneakers |
|---|---|---|---|
| booties | clogs | wedges | High heel sandals |
| Over the knee boots | pumps | stilettos | flats |

The given dictionary data is assigned with weights for generating probability scores in order to show the relation of each product with the category as, x<-c (0.85, 0.80, 0.75, 0.70)
x'<-c (0.85, 0.80)
y<-c (0.80, 0.80)
names(x)<-c ("sneaker", "slides", "moccasins", "belle")
names(x')<-c ("classic pumps", "mules")
names(y)<-c ("casual", "formal")

The weights may vary with iterations based on model performance. This dictionary data is built for contextual understanding of the training set, in order to guide the algorithm on the data for generating semantic similarity-based product categorization.

At step 204 of the method 200 the one or more hardware processors 104 preprocess the set of product data by removing extraneous text based on a predefined template. Referring now to the example, from the received user query comprising the set of product data extraneous or unwanted texts are removed for uniform representation of data using the predefined template. The extraneous text may include comma, dots, error code, dropping unnecessary columns, the unmatched product data text from the predefined template and the like. The data obtained from an external source needs to be processed for an algorithm to ingest and work upon.

At step 206 of the method 200 the one or more hardware processors 104 create a dictionary for the set of product data based on a set of attributes comprising a product key with its corresponding product value. Here, dictionary is created for the set of product data of footwear based on the set of attributes. The dictionary data is built using the product category and products as the key-value pair respectively. In the next step some weights are assigned to each key and value based on likelihood of product, for arriving at a suitable relevancy or probability score. This forms the base of contextual understanding of the data to be fed to the model.

At step 208 of the method 200 the one or more hardware processors 104 extract a multi-level contextual data for the set of product data, by assigning a weight to each product data based on likelihood and creating a set of datapoints for each product data. To extract the multi-level contextual data from the set of product data for the said example, initially a similarity match is performed for each product data with a training dataset associated with a pretrained Word2Vec model. Further, a weight is assigned to each product data for the closest similarity semantic match based on (i) a product weight, and (ii) a product category weight.

The product weight is the ratio of count of product distribution to the product as described below in equation 1, $$\text{Product\_weight (pw)} = \text{Count of (Product\_distribution/Product)} \quad \text{equation 1}$$

Referring now to the example then, product weight is described as below in equation 2, $$pw = \text{count of ([Ravington Boots,Lace up Boots,Riding Boots,Ankle Boots, ... ])/Boots} \quad \text{equation 2}$$

The product category weight is the ratio of count of product category distribution to the product category as described below in equation 3, $$\text{Product}_{category_{weight(pcw)}} = \text{Count of} \left( \frac{\text{product category distribution}}{\text{product category}} \right) \quad \text{equation 3}$$

Referring now to the example then, product weight is described as below in equation 4, $$pcw = \text{count of ([Formal,Casual,Party,Outdoor, Sports)]/Women's Footwear} \quad \text{equation 4}$$

Then, pivoting for the product data (Table 2) is performed to obtain counts of each product data based on the product category, and reindexing the assigned weights (Table 3) to align with the pivot table index.

TABLE 2 pivoting the product data

| | | Product | | |
|---|---|---|---|---|
| | | Sneakers | Slippers | Sandals |
| Product Category | Casual | 1 | 1 | 0 |
| | Party | 0 | 0 | 2 |
| | Outdoor | 2 | 0 | 0 |

TABLE 3 reindexing the product data

| Product | Product Category | Weights |
|---|---|---|
| Sneakers | Casual | 0.80 |
| Slippers | Party | 0.75 |
| Sandals | Outdoor | 0.45 |

Further, the set of data points are created (Table 4) based on the assigned weights using the pivot table index for each product categorization.

TABLE 4

Datapoint creation

| | | Product | | |
|---|---|---|---|---|
| | | Sneakers | Slippers | Sandals |
| Product Category | Casual | 0.0125 | 0.0125 | 0 |
| | Party | 0 | 0 | 0.075 |
| | Outdoor | 0.050 | 0 | 0 |

The weight is assigned using the product weight and the product category weight as described below in equation 5, $$x - y_{t,d} = x_{t,d} X y_t \quad \text{equation 5}$$

In the given equation: 't' is a product and 'd' is a product category. x-y does not have any significant meaning. They are representation of any weights or bias added to 't' and 'd' in this equation. Weights generally add to the sharpness or steepness of inputs, which leverages semantic similarity. The iteration of weights across the product data depicts the probability scenario of contextual data understanding and the weighted data represents the final formula of contextuality as described in equation 6 and equation 7, $$y = f(net) = f(w_i x + b) \quad \text{equation 6}$$

$$g(x) = f(w_i x_i + b) \quad \text{equation 7}$$

Then,
f(net)=1 for net≥0,
f(net)=−1 for net<0
y=−1, if $w_i x_i + b < 0$
y=1, if $w_i x_i + b \geq 0$ The product weight is the ratio of total count of product distribution to the product data. The Word2Vec model is trained by feeding the created datapoints for similarity mapping. The Word2Vec model fetches random words for the set of product data text, based on its cosine similarity with the other. The algorithm is made contextually aware of the fashion footwear data, so that the final output gives us the correct results. Training inputs are a product of the word vectors of the text data and the assigned weights. It is to be noted that, if $x_i$ is a product, then $w_i$ is a weight associated with it and if $y_j$ is the product category, then $w_j$ is the weight associated with it. Inputs to algorithm may be summed up as: $\Sigma x_i \cdot w_i$ where 0<i<n and $\Sigma y_j \cdot w_j$, where 0<j<n At step 210 of the method 200 the one or more hardware processors 104 categorize the set of product data by feeding the set of data points to a set of predefined parameters to compute a minimum count, a total size, total number of epochs, a skip gram value and a hierarchical softmax. Here, the probability of contextual data understanding, and weighted data is described in equation 8, $$pf(x) = wfp(x) + + (1-wf)pw(x) \quad \text{equation 7}$$

$$pf(x_i) = wfp(x_i) + + (1-wf)pw(x_i) \quad \text{equation 8}$$

Here, the contextually aware datapoints are created through dictionary and weights assignment are passed through the set of predefined parameters based on the Word2Vec model. For the set of predefined parameters computing the dimension of each input vector, the total number of epochs, the skip gram value and a hierarchical softmax activation function.

The written description describes the subject matter herein to enable any person skilled in the art to make and use of the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of product data categorization. The embodiment thus provides a method and system for product data categorization based on text and attribute factorization. Moreover, the embodiment herein further provides extracting multi-level contextual data for the set of product data for categorization of the set of product data using the pretrained Word2Vec model. The method makes use of minimum information such as the product name and the product category name. The Word2Vec model is a shallow neural network, and the data is enriched in a way, that the network works on product categorization efficiently & performs almost parallel to that of a deep neural network.

The present disclosure is versatile and can be applied across various retail products.

It is to be understood that the scope of the protection is extended to such a program and in addition to a computer-readable means having a message therein; such computer-readable storage means contain program-code for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiment described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for product data categorization, the method comprising:
    acquiring, via one or more hardware processors, an input describing a set of product data from an application data store for categorization;
    preprocessing, via the one or more hardware processors, the set of product data by removing one of extraneous text and unwanted text based on a predefined template, wherein the extraneous text includes comma, dots, error code, dropping unnecessary columns, unmatched product data text from the predefined template;
    creating, via the one or more hardware processors, a dictionary for the set of product data based on a set of attributes further comprising a product key with its corresponding product value, wherein a dictionary data is built with a product category and products as a key-value pair;
    extracting, via the one or more hardware processors, a multi-level contextual data for the set of product data, by assigning a weight to each product data based on likelihood of the product for arriving at a suitable relevancy or probability score, and creating a set of datapoints for each product data, wherein the weight adds to sharpness or steepness of the input, which leverages semantic similarity and iteration of the weights across each product data depicts probability scenario of contextual data understanding and weighted data represents contextuality; and
    categorizing, via the one or more hardware processors, the set of product data by feeding the set of data points to a set of predefined parameters to compute a minimum count, a total size, total number of epochs, a skip gram value and a hierarchical softmax upon pivoting the set of product data to obtain counts based on the product category and reindexing the assigned weights to align with a pivot table index followed by creating the set of data points based on the assigned weights using the pivot table index for each product categorization, wherein contextually aware datapoints are created through dictionary and weight assignment are passed based on a pretrained Word2Vec model, and wherein the pre-trained Word2Vec model is trained by feeding the created datapoints for similarity mapping and training inputs are a product of word vectors of text data and the assigned weights.

2. The processor implemented method as claimed in claim 1, wherein extracting the multi-level contextual data comprises:
    performing, a similarity match for each product data with a training dataset associated with the pretrained Word2Vec model; and
    assigning, a weight to each product data for the closest similarity semantic match based on (i) a product weight, and (ii) a product category weight.

3. The processor implemented method as claimed in claim 2, wherein the product weight is the ratio of total count of product distribution to the product data.

4. The processor implemented method as claimed in claim 2, wherein the product category weight is the ratio of total count of product data category distribution to the product data category.

5. A system for product data categorization, further comprising:
    a memory storing instructions;
    one or more communication interfaces; and
    one or more hardware processors coupled to the memory via the one or more communication interfaces, wherein the one or more hardware processors are configured by the instructions to:
    acquire, an input describing a set of product data from an application data store for categorization;
    preprocess, the set of product data by removing one of extraneous text and unwanted text based on a predefined template, wherein the extraneous text includes comma, dots, error code, dropping unnecessary columns, unmatched product data text from the predefined template;
    create a dictionary for the set of product data based on a set of attributes further comprising a product key with its corresponding product value, wherein a dictionary data is built with a product category and products as a key-value pair;
    extract, a multi-level contextual data for the set of product data, by assigning a weight to each product data based on likelihood of the product for arriving at a suitable relevancy or probability score, and creating a set of datapoints for each product data, wherein the weight adds to sharpness or steepness of the input, which leverages semantic similarity and iteration of the weights across each product data depicts probability scenario of contextual data understanding and weighted data represents contextuality; and
    categorize, the set of product data by feeding the set of data points to a set of predefined parameters to compute a minimum count, a total size, total number of epochs, a skip gram value and a hierarchical softmax upon pivoting the set of product data to obtain counts based on the product category and reindexing the assigned weights to align with a pivot table index followed by creating the set of data points based on the assigned weights using the pivot table index for each product categorization, wherein contextually aware datapoints are created through dictionary and weight assignment are passed based on a pretrained Word2Vec model, and wherein the pre-trained Word2Vec model is trained by feeding the created datapoints for similarity mapping and training inputs are a product of word vectors of text data and the assigned weights.

6. The system of claim 5, wherein extracting the multi-level contextual data comprises:

performing, a similarity match for each product data with a training dataset associated with the pretrained Word2Vec model; and assigning, a weight to each product data for the closest similarity semantic match based on (i) a product weight, and (ii) a product category weight.

7. The system of claim 6, wherein the product weight is the ratio of total count of product distribution to the product data.

8. The system of claim 6, wherein the product category weight is the ratio of total count of product data category distribution to the product data category.

9. One or more non-transitory machine-readable information storage mediums comprising one or more instructions which when executed by one or more hardware processors cause:

acquiring, an input describing a set of product data from an application data store for categorization;

preprocessing, the set of product data by removing one of extraneous text and unwanted text based on a predefined template, wherein the extraneous text includes comma, dots, error code, dropping unnecessary columns, unmatched product data text from the predefined template;

creating, a dictionary for the set of product data based on a set of attributes further comprising a product key with its corresponding product value, wherein a dictionary data is built with a product category and products as a key-value pair;

extracting, a multi-level contextual data for the set of product data, by assigning a weight to each product data based on likelihood of the product for arriving at a suitable relevancy or probability score, and creating a set of datapoints for each product data, wherein the weight adds to sharpness or steepness of the input, which leverages semantic similarity and iteration of the weights across each product data depicts probability scenario of contextual data understanding and weighted data represents contextuality; and categorizing, the set of product data by feeding the set of data points to a set of predefined parameters to compute a minimum count, a total size, total number of epochs, a skip gram value and a hierarchical softmax upon pivoting the set of product data to obtain counts based on the product category and reindexing the assigned weights to align with a pivot table index followed by creating the set of data points based on the assigned weights using the pivot table index for each product categorization, wherein contextually aware datapoints are created through dictionary and weight assignment are passed based on a pretrained Word2Vec model, and wherein the pre-trained Word2Vec model is trained by feeding the created datapoints for similarity mapping and training inputs are a product of word vectors of text data and the assigned weights.

10. The one or more non-transitory machine-readable information storage mediums of claim 9, wherein extracting the multi-level contextual data comprises:

performing, a similarity match for each product data with a training dataset associated with the pretrained Word2Vec model; and assigning, a weight to each product data for the closest similarity semantic match based on (i) a product weight, and (ii) a product category weight.

11. The one or more non-transitory machine-readable information storage mediums of claim 10, wherein the product weight is the ratio of total count of product distribution to the product data.

12. The one or more non-transitory machine-readable information storage mediums of claim 10, wherein the product category weight is the ratio of total count of product data category distribution to the product data category.

* * * * *